US008918768B2

(12) United States Patent
Chevallier-Mames et al.

(10) Patent No.: US 8,918,768 B2
(45) Date of Patent: Dec. 23, 2014

(54) METHODS AND APPARATUS FOR CORRELATION PROTECTED PROCESSING OF DATA OPERATIONS

(71) Applicant: Apple Inc., Cupertino, CA (US)

(72) Inventors: Benoit Chevallier-Mames, Paris (FR); Mathieu Ciet, Paris (FR); Thomas Icart, Paris (FR); Bruno Kindarji, Paris (FR); Augustin J. Farrugia, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 68 days.

(21) Appl. No.: 13/707,437

(22) Filed: Dec. 6, 2012

(65) Prior Publication Data

US 2014/0165030 A1 Jun. 12, 2014

(51) Int. Cl.
*G06F 9/44* (2006.01)
*G06F 9/45* (2006.01)

(52) U.S. Cl.
CPC ........................................ *G06F 8/30* (2013.01)
USPC ............................ 717/140; 717/120; 717/151

(58) Field of Classification Search
None
See application file for complete search history.

(56) References Cited

U.S. PATENT DOCUMENTS

| | | | | |
|---|---|---|---|---|
| 6,405,364 B1 * | 6/2002 | Bowman-Amuah | .......... | 717/120 |
| 6,536,037 B1 * | 3/2003 | Guheen et al. | ................ | 717/151 |
| 6,615,166 B1 * | 9/2003 | Guheen et al. | ................ | 717/140 |
| 6,662,357 B1 * | 12/2003 | Bowman-Amuah | .......... | 717/120 |
| 6,668,325 B1 * | 12/2003 | Collberg et al. | .............. | 713/194 |
| 6,718,535 B1 * | 4/2004 | Underwood | .................. | 717/120 |
| 7,322,045 B2 * | 1/2008 | Kiddy | ............................ | 726/26 |
| 7,739,511 B2 | 6/2010 | Horne et al. | | |
| 7,779,394 B2 * | 8/2010 | Horning et al. | ............... | 717/140 |
| 8,185,749 B2 * | 5/2012 | Ciet et al. | ...................... | 713/190 |
| 8,307,354 B2 * | 11/2012 | Haga et al. | .................... | 717/159 |
| 8,393,003 B2 * | 3/2013 | Eker et al. | ........................ | 726/26 |
| 8,578,348 B2 * | 11/2013 | Fliess et al. | ................... | 717/151 |
| 8,645,930 B2 * | 2/2014 | Lattner et al. | ................. | 717/140 |
| 8,661,549 B2 * | 2/2014 | Chevallier-Mames et al. | . | 726/26 |
| 2005/0183072 A1 * | 8/2005 | Horning et al. | ............... | 717/140 |
| 2005/0204348 A1 * | 9/2005 | Horning et al. | ............... | 717/140 |
| 2006/0136867 A1 * | 6/2006 | Schneider et al. | ............ | 717/120 |
| 2008/0163185 A1 * | 7/2008 | Goodman | ...................... | 717/151 |
| 2010/0281459 A1 * | 11/2010 | Betouin et al. | ................ | 717/106 |
| 2011/0035733 A1 * | 2/2011 | Horning et al. | ............... | 717/140 |

(Continued)

OTHER PUBLICATIONS

Popa, et al., CryptDB: Protecting Confidentiality with Encrypted Query Processing; 2011 ACM; [retrieved on Sep. 16, 2014]; Retreived from Internet<URL:http://dl.acm.org/citation.cfm?id=2043556>pp. 85-100.*

(Continued)

*Primary Examiner* — Xi D Chen
(74) *Attorney, Agent, or Firm* — Blakely, Sokoloff, Taylor & Zafman LLP

(57) ABSTRACT

A method and an apparatus for receiving a first source code having a code block to update the first source code with multiple copies of the code block to protect against correlation attacks are described. The code block can perform one or more operations for execution based on the first source code. The operations can be performed via a random one of the copies of the code block. A second source code based on the updated first source code can be generated to be executed by a processor to produce an identical result as the first source code.

30 Claims, 13 Drawing Sheets

(56) References Cited

U.S. PATENT DOCUMENTS

| | | |
|---|---|---|
| 2011/0283115 A1 | 11/2011 | Junod |
| 2012/0192283 A1 | 7/2012 | Gu et al. |
| 2012/0221864 A1* | 8/2012 | Ciet et al. .................. 713/190 |
| 2012/0254625 A1 | 10/2012 | Farrugia et al. |
| 2012/0284792 A1 | 11/2012 | Liem |

OTHER PUBLICATIONS

Halfond, Orso, "Amnesia: Analysis and Monitoring for NEutralizing SQL-Injectin Attacks" 2005 ACM; [retrieved on Sep. 16, 2014]; Retreived from Internet<URL: http://dl.acm.org/citation.cfm?id=1101908>pp. 174-183.*

Cheng, et al., "On Obfuscating Set-membership Predicate Functions"; 2013 IEEE;[retrieved on Sep. 16, 2014]; Retrieved from Internet<URL:http://ieeexplore.ieee.org/stamp/stamp.jsp?tp=&arnumber=6630427>pp. 304-308.*

Link, Neumann, "Clarifying Obfuscation Improving the Security of White-Box DES"; 2005 IEEE;retrieved on Sep. 16, 2014]; Retreived from Internet<URL:http://ieeexplore.ieee.org/stamp/stamp.jsp?tp=&arnumber=1428542>pp. 1-6.*

* cited by examiner

700

```
┌─────────────────────────────────────────────────────────────────────┐
│ Receiving first source code having a code block to perform one or more │
│    operations for execution based on the first source code 701      │
└─────────────────────────────────────────────────────────────────────┘
                                  │
                                  ▼
┌─────────────────────────────────────────────────────────────────────┐
│ Updating the first source code with two or more copies of the code block, the │
│   operations performed via a random one of the copies of the code block 703  │
└─────────────────────────────────────────────────────────────────────┘
                                  │
                                  ▼
┌─────────────────────────────────────────────────────────────────────┐
│ Generating second source code based on the updated first source code, the │
│  second code, when executed by a processor, producing an identical result as │
│                        the first source code 705                    │
└─────────────────────────────────────────────────────────────────────┘
```

Receiving first source code having multiple copies of a code block located at separate code locations in the first source code, each copy of the code block to perform one or more operations 801

Updating the first source code with one copy of the code block to replace the multiple copies of the code block for the one or more operations 803

Generating second source code based on the updated first source code, the second code, when executed by a processor, producing an identical result as the first source code 805

```
Receiving first source code having a particular execution path including a code
block of the first source code 901
```
↓
```
Updating the first source code with two ore more execution paths, each
execution path equivalent to the particular execution path, the updated first
source code including selection code and two or more copies of the code block,
each execution path including a separate one of the copies of the code block,
the selection code to randomly select one of the execution paths 903
```
↓
```
Generating second source code based on the updated first source code, the
second code, when executed by a processor, producing an identical result as
the first source code 905
```

Receiving first source code having a particular execution path including a first code block followed by a second code block, the first source code including the first code block and the second code block 1001

Updating the first source code with a first number copies of the first code block, a second number copies of the second code block, and selection code, the updated first source code having a third number of execution paths, each execution path equivalent to the particular execution path, each exection path including one of the copies of the first code block and one of the copies of the second code block, the selection code to randomly select one of the execution paths 1003

Generating second source code based on the updated first source code, the second code, when executed by a processor, producing an identical result as the first source code 1005

Executing executable code accessing a key value, the executable code including two or more copies of a code block to perform one or more operations using the key value, each copy of the code block addressed via a separate instruction address in the executable code 1201

Determining randomly one of the separate instruction addresses for a particular one of the copies of the code block 1203

Performing the operations via the particular one copy of the code block in the executable code, result of the operations performed being independent of which copy of the code blocks addressed by the random one separate instruction address to prevent correlation between the key value and the particular copy of the code block 1205

Fig. 12

METHODS AND APPARATUS FOR CORRELATION PROTECTED PROCESSING OF DATA OPERATIONS

FIELD OF INVENTION

The present invention relates generally to cryptographic data processing. More particularly, this invention relates to protecting against security attacks on white-box cryptographic operations based on memory address correlation.

BACKGROUND

In the field of security, there is a need for fast and secure encryption. This is why the AES (ADVANCED ENCRYPTION STANDARD), Federal Information Processing Standards Publication 197, Nov. 26, 2001) has been designed and standardized.

Software implementation of cryptographic building blocks, such as in WhiteBox cryptography, are insecure in the white box threat model where the attacker controls the execution process. The attacker can easily lift the secret key from memory by just observing the operations acting on the secret key. For example, the attacker can learn the secret key of an AES software implementation by observing the execution of the Key Schedule algorithm. This attack is thus important since it gives clues on the execution of the protected code to simplify the reverse engineering. As a result, it also enables to security attacks in the case of WhiteBox operations to retrieve the secret hidden within the WhiteBox operations.

For example, DRM (Digital Right Management) applications using fixed-key white box AES are one instance where it is desired to keep the attacker from finding the secret key used in the fixed-key white box AES even though the attacker has complete control of the execution process. A construction of the AES algorithm for such white box model has been described in Chow et. al. (Stanley Chow, Philip A. Eisen, Harold Johnson, Paul C. van Oorschot: White-Box Cryptography and an AES Implementation. Selected Areas in Cryptography 2002: 250-270). The security of this construction resides in the use of table lookups and masked data. The input and output mask applied to this data is never removed along the process. In this solution, there is a need for knowing the key value at the compilation time, or at least to be able to derive the tables from the original key in a secure environment.

However, this solution does not solve all the needs for block cipher's encryption and decryption. Indeed, the case where the key is derived through a given process and then unknown at the compilation time is not included. One typical use case is when a software program is distributed over several users and each of them has their own key. It is, from a practical point of view, impossible to disseminate different code to each user. Another use case is when generating session keys (different for each session) through a given process. Of course, in this case the key is unknown at the compilation time. A last use case is when it is necessary to store an abundance of keys. It is not reasonable to consider storing about 700 kB for each key.

Therefore, traditional implementations of white box cryptographic operations may be susceptible to attacks from attackers who have control over execution of the cryptographic operations.

SUMMARY OF THE DESCRIPTION

Correlation proof implementation of white box cryptographic operations are provided to increase the complexity in linking mathematical values of variables in the white box operations with values of variables of classical implementation. The execution values may be values observable by an attacker from memory used during execution of the cryptographic operations. In one embodiment, memory locations corresponding to a mathematical value (e.g. for a variable in the white box cryptographic operations) may be dynamically changed, replicated, or relocated at different locations in the memory to increase complexity in launching correlation attacks. The correlation attacks may be between a protected implementation of cryptographic operations and an unprotected implementation of the operations to correlate variables in the unprotected implementations to expose corresponding variables in the protected implementations. Thus, computational resources can rise to an impractical level to prohibit the correlation attacks. In some embodiments, the white box cryptographic operations may include implementations of AES to ensure that variables appearing in the white box implementation cannot be correlated to variables used in classical AES implementations.

In one embodiment, a first source code having a code block is received. The code block can perform one or more operations for execution based on the first source code. The first source code may be updated with two or more copies of the code block. The operations can be performed via a random one of the copies of the code block. A second source code based on the updated first source code can be generated to be executed by a processor to produce an identical result as the first source code.

In another embodiment, first source code can be received for execution in a processor. The first source code can have multiple copies of a code block located at separate code locations in the first source code. Each copy of the code block may perform one or more operations. The first source code can be updated with one copy of the code block to replace the multiple copies of the code block for the operations. A second source code can be generated based on the updated first source code. The second code can be executed by a processor to produces an identical result as the first source code.

In another embodiment, a first source code having a particular execution path can be received for execution. The particular execution path can include a code block. The first source code can be updated with two ore more execution paths. Each execution path may be equivalent to the particular execution path. The updated first source code can include selection code and two or more copies of the code block. Each execution path may also include a separate one of the copies of the code block. The selection code can randomly select one of the execution paths. A second source code can be generated based on the updated first source code. The second source code can be executed by a processor to produce an identical result as the first source code.

In another embodiment, a first source code can be received for execution. The first source code can have a particular execution path including a first code block followed by a second code block, the first source code including the first code block and the second code block. The first source code can be updated with a first number copies of the first code block, a second number copies of the second code block, and a selection code. The updated first source code can have a third number of execution paths. Each execution path may be equivalent to the particular execution path. Each execution path may include one of the copies of the first code block and one of the copies of the second code block. The selection code can randomly select one of the execution paths for execution during runtime. A second source code can be generated based on the updated first source code. The second code, when executed by a processor, can produce an identical result as the first source code.

In another embodiment, a first source code having a particular execution path is received for execution. The particular execution path can include a code block of the first source code. The particular execution path can reference a variable. The first source code may be updated with two ore more execution paths. Each of the execution paths may be equivalent to the particular execution path. The updated first source code can include selection code and two or more updated code blocks. The selection code may include a selection variable which can be assigned with one of a number of selection values. Each selection value can represent one of the execution paths. The selection code may randomly select one of the execution paths. Each execution path may include a separate one of the updated code blocks. Each of the updated code blocks may have a copy of the code block and a neutral code. The neutral code may reference one of the selection values and the selection variable. The neutral code can perform operations on the variable using the one selection value and the selection variable to obfuscate the updated first source code. A second source code can be generated based on the updated first source code. The second source code can be executed by a processor to produce an identical result as the first source code.

In another embodiment, an executable code can be executed to access a key value. The executable code can include two or more copies of a code block to perform one or more operations using the key value. Each copy of the code block may be addressed via a separate instruction address in the executable code. One of the separate instruction addresses may be randomly determined for a particular one of the copies of the code block. The operations may be performed via the particular one copy of the code block. Results of the operations performed may be independent of which copy of the code blocks addressed by the randomly determined one separate instruction address to prevent correlation between the key value and the particular copy of the code block. Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 7 is a flow diagram illustrating one embodiment of a process for obfuscating source code via multiple copies of a code block in the source code;

FIG. 8 is a flow diagram illustrating one embodiment of a process for obfuscating source code having multiple copies of a code block via a single copy of the code;

FIG. 9 is a flow diagram illustrating one embodiment of a process for obfuscating source code having an execution path via multiple equivalent execution paths;

FIG. 10 is a flow diagram illustrating one embodiment of a process for obfuscating source code having an execution path via multiple equivalent sub execution paths in the execution path;

FIG. 12 is a flow diagram illustrating one embodiment of a process for execution randomly selected equivalent instructions compiled from obfuscated source code;

DETAILED DESCRIPTION

Figure 1:
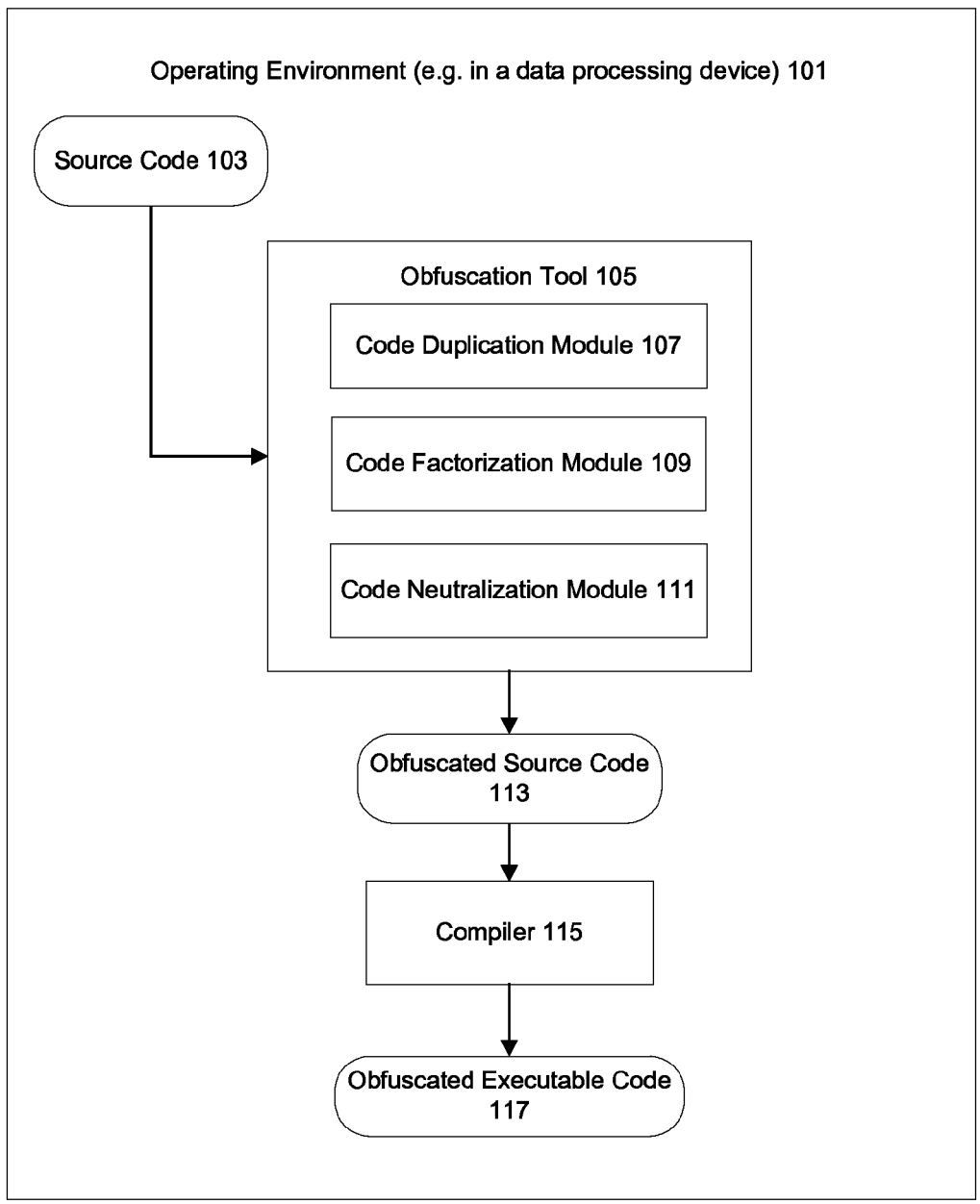
FIG. 1 is a block diagram illustrating one embodiment of a system for obfuscating source code.

Methods and apparatuses for correlation attacks protected processing of cryptographic operations are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, execution complexity may be added to execution flows in executable code without changing execution results to deter or stop statistical attacks to uncover secrets or key values embedded inside the executable code. An execution flow may correspond to a sequence of addresses of instructions that are being executed. Adding complexity to an execution flow can make it very hard to identify or find links between mathematical values and their WhiteBox/Obfuscated counterparts observable when executing the executable code.

For example, the executable code may perform WhiteBox operations based on a well known algorithm, such as AES. The keys or secrets associated with the executable code may be obfuscated inside the executable code. With the added complexity in the execution flow, it can become computationally impractical or impossible to uncover the secrets via values observed in a runtime memory for executing the executable code.

Several possible statistical links to attack WhiteBox cryptographic processing can be prevented. For instance, a given mathematical value may be in a "1-to-1" relation with a WhiteBox/obfuscated value. In other words, a given mathematical quantity X appearing in the mathematical computation can be represented by a value Y=f(X) in the WhiteBox/obfuscated version of a known algorithm for the cryptographic processing. The function f may be recovered (or exhausted) with a statistical attack. The relation can also be an n-to-1 relation, meaning that X can be represented as several Y_i, for Y_i=f(X, i). In other words, the same value X can have several representations, but that a given representation Y_i does only correspond to one single X.

Statistical or correlation attacks on the WhiteBox cryptographic processing including Y=f(X) may be possible via the knowledge of the function f. Function f can depend on a variety of dynamic (e.g. runtime based) or static (e.g. predetermined at code compilation time) factors, such as server information, the ID of the user, characteristics of the machine hosting the cryptographic processing, random parameters picked at some moments during execution, addresses of the executed lines of source code and/or other applicable factors.

Correlation attacks using statistical information in a cryptographic processing may be prevented by making links unavailable (or computationally hard to identify) between, for example, mathematical values for a computation of the processing and values being read and written during the execution of a WhiteBox version of the computation. Thus, these links may not be known to an adversary targeting unknown keys of the cryptographic processing based on known keys to reveal new information.

Further, correlation attacks based on known information may be stopped by raising the complexity level to find these links. Known (or available) information may include known input values to the computation via multiple executions of the computation (or algorithmic computation) with computation records logged. Available information may include, for example, the description of the computation or algorithms (e.g. computing and using a value x=input⊕key during the computation AES), and/or inputs and outputs of the algorithm used in the computation, etc. As the links are made practically impossible to find, even sophisticated correlation attacks without a need for known keys, such as launching the execution by controlling desired inputs values, may be prohibited.

In some embodiments, an executable code associated with an input may be updated to execute without changing the result of the execution to provide different runtime values for different runs of the execution with the input maintained constant. For example, different runtime values other than a mathematical value x may be computed (e.g. some values other than the value x) during runtime. Thus, correlation between the result of the execution and the mathematical value x may not be uncovered. For example, logging records of various runs of the execution may record different values for different runs of the execution. No lines in the records may indicate a correlation with an input which was kept constant for the different runs of the execution.

Examples of the cryptographic operations protected from correlation attacks may include AES operations, such as AddRoundKey operation, SubByte (SB) operation, ShiftRow operation and MixColumn (MC) operations, etc. Typically cryptographic operations based on AES may be performed with 11 AddRoundKey (ARK) operations, 10 SubByte operations, 10 ShiftRow (SR) operations and 9 MixColumn operations.

AES operations protected from correlation attacks may include decryption operations using, for example, a 16 byte key. Preliminary to the decryption itself, the original 16 byte key may be expanded to 11 sub-keys during the key-scheduling operation in the AES operations. Each subkey can be 16 bytes long. The decryption operation may include taking the inverse operations in a reverse order. Inverse of ARK is ARK itself. The inverse of SB is the inverse subbyte (ISB) operation which is basically another TLU (Table Look Up). The inverse of MC is the inverse mix column (IMC) which is basically another TLU. The inverse of SR is the inverse shift row (ISR) which is another move from one byte location to another byte location.

FIG. 1 is a block diagram illustrating one embodiment of a system for obfuscating source code. For example, system 100 may include operating environment 101 hosted in a data processing device, such as a mobile device, a desktop computer, or a server, etc. Operating environment 101 may include, but is not limited to, obfuscation tool 105 to generate obfuscated source code 113 from source code 103. Compiler 115 may compile obfuscated source code 113 to generate obfuscated executable code 117 that is executable by a processor. Compiler 115 can compile source code 103 to generate executable code to perform operations to provide the same result as operations performed by the obfuscated executable code 117. Obfuscation tool 105 can be implemented as a standalone tool, a plug-in application, a static or dynamic module, and/or integrated with compiler 115. Source code 103 can be written in a variety of programming languages such as C/C++, Java or other applicable programming languages. Compiler 115 can be any kind of compiler.

In one embodiment, obfuscation tool 105 can include code obfuscation modules, such as code duplication module 107, code factorization module 109 and/or code neutralization module 111. A combination of code obfuscation modules can be invoked via code obfuscation module 105 to update source code 103 and can maintain the same functionality (e.g. without affecting computation results) of source code 103 while weakening correlation between data values (e.g. secret keys) embedded in (or associated with) the source code and execution values observable during run time.

For example, code duplication module 107 can perform code duplication operations to update source code 103. Code duplication operations may insert multiple copies of an original code block of source code 103. During run time for executing the updated source code, one of the copies may be randomly selected for the execution. Each code block may represent the sequence of consecution code (lines of codes, specifications, instructions etc.) in the source code text. Code duplication module 107 may automatically identify one or more code blocks from source code 103 to perform code duplication operations. In some embodiments, code duplication module 107 may be user configurable, e.g. to allow user selections on which code block to duplicate, which code block not to duplicate etc. Alternatively, or optionally, code duplication module 107 may determine which code block to duplicate based on, for example, control flow analysis on a source code.

According to one embodiment, code factorization module 109 may perform code factorization operations to update source code 103. Code factorization options may replace multiple copies of a code block in source code 103 with one single copy of the code block, for example, as a function, sub code etc. which may be called upon multiple times during runtime to increase the number of jump instructions to instruction addresses. As a result, code factorization operations can add additional complexity to a control flow of source code 103 without changing its functionality. Code neutralization module 111 can update source code 103 with neutral code to perform effectively self canceling operations without affecting results of execution during runtime. Neutral code can modify execution paths of source code 103 to avoid direct recognition of original instruction sequence.

Figure 2:
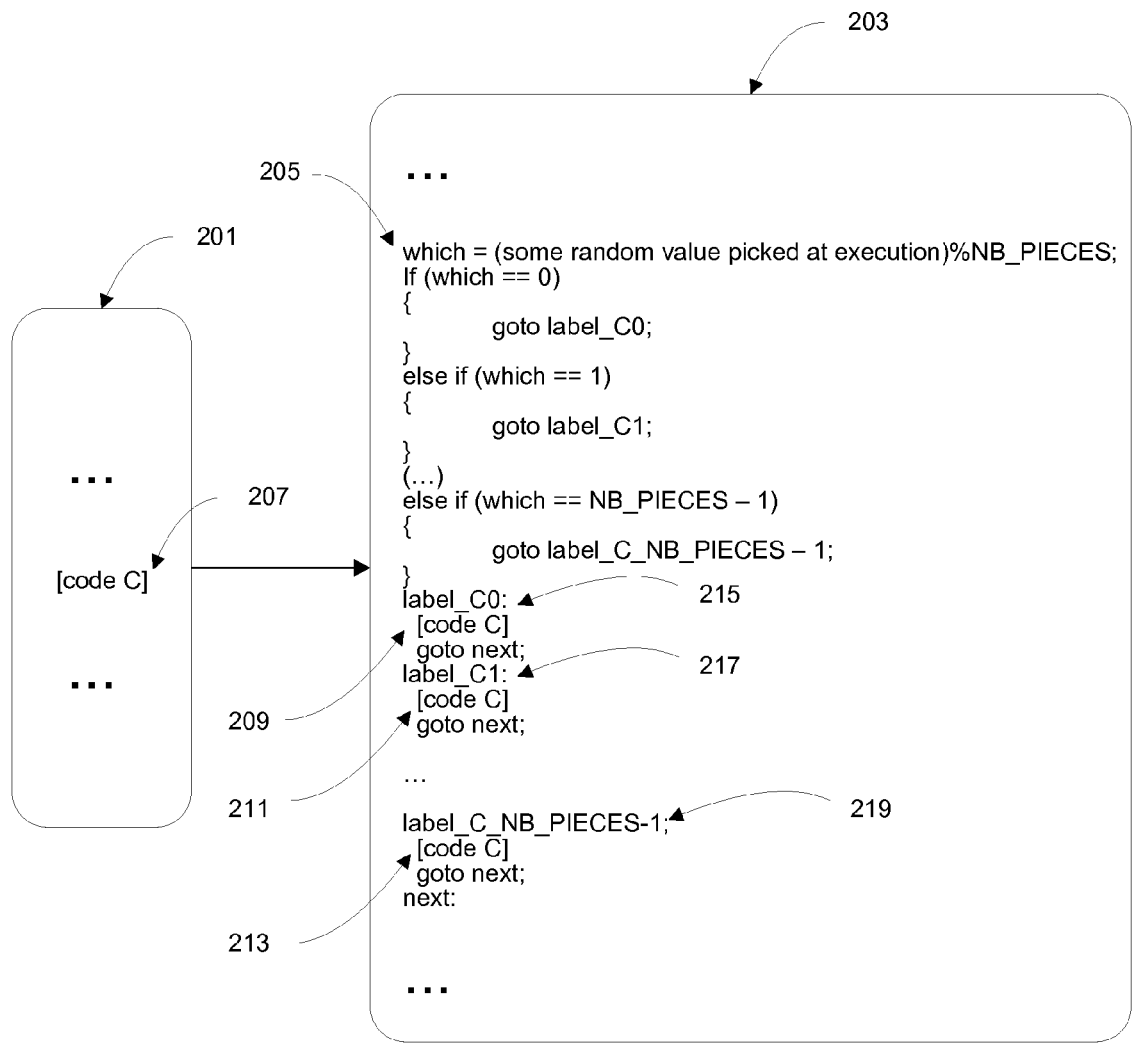
FIG. 2 is a code diagram illustrating sample pseudocodes with multiple copies of a code block according to one embodiment of the invention.

FIG. 2 is a code diagram illustrating sample pseudocodes with multiple copies of a code block according to one embodiment of the invention. In one embodiment, code 200 may be provided based on some components of system 100 of FIG. 1. Source code 201 may include a small piece of code block 207. Code block 207 may comprise consecutive lines of code indicating a sequence of instructions to be executed in order during runtime. An attacker may try to make statistics on code block 207 to mount correlation attacks.

In one embodiment, several copies of code block 207 may be duplicated (e.g. with equivalent pieces of code) to update source code 201 for preventing correlation attacks without changing results of execution. For example, one of code copies 209, 211, 213 etc. may be randomly selected for execution at each execution. Thus, different instruction addresses may appear for executing equivalent pieces of code to increase correlation complexity.

Furthermore, a function corresponding to code 207 can be executed N times, each label (e.g. labels 215, 217, 219, etc.) may be used or accessed about N/NB_PIECES times. As it is needed to execute a certain number of times for a given line of code to find correlations, the number of executions or runs on code 203 may be increased (e.g. multiplied by NB_PIECES) to mount statistical attacks against code 203 compared with code 201. In some embodiments, each label 215, 217, 219 etc. can be obfuscated in a different ways in order to harden reverse engineering against code 203.

According to one embodiment, code block 207 may include several subparts or code partitions, for example, belonging to different code branches (e.g. based on a decision on a runtime value of a variable). Each subpart may be duplicated in different ways resulting in different execution flows following the corresponding code branches.

Figure 3:
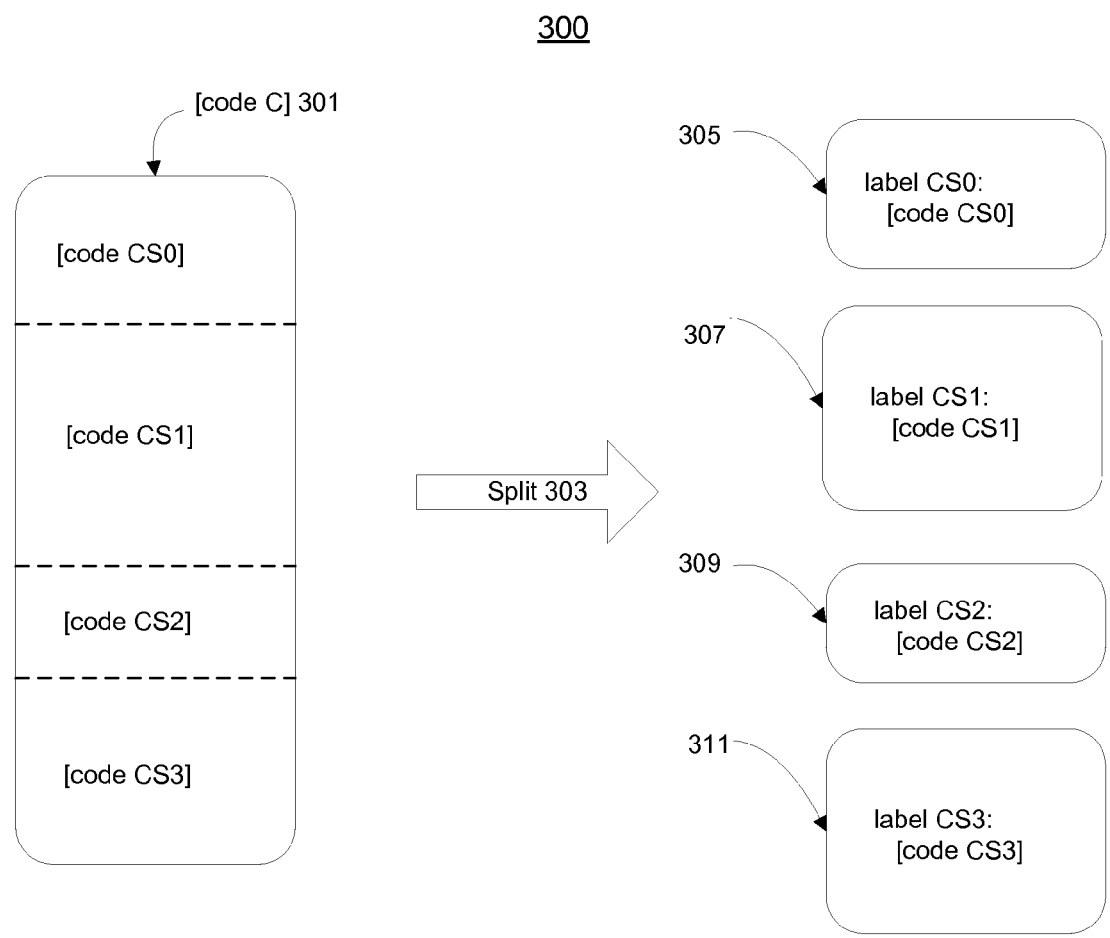
FIG. 3 is a block diagram illustrating an exemplary code split operation according to one embodiment of the invention.

FIG. 3 is a block diagram illustrating an exemplary code split operation according to one embodiment of the invention. For example, code 300 may be provided via split operations based on some components of system 100 of FIG. 1. Code block 301, such as code block 207 of FIG. 2, may include four partitions, namely CS0, CS1, CS2, CS3, which may be split arbitrarily from code block 301, via split operation 303. Each split partition 305, 307, 309, 311 may correspond to different code blocks (e.g. separate and non consecutively located) having separate labels in an updated source code as a result of split operations on the original source code having code block 301.

Note also that several subparts of code block 207 can also benefit from the duplication and/or split operations which may be separately performed in different ways. In some embodiments, the updated source code may include multiple branches of execution paths via these duplication and/or split operations to allow different (e.g. random) execution paths according to the branches for each execution of the updated source code.

Figure 4:
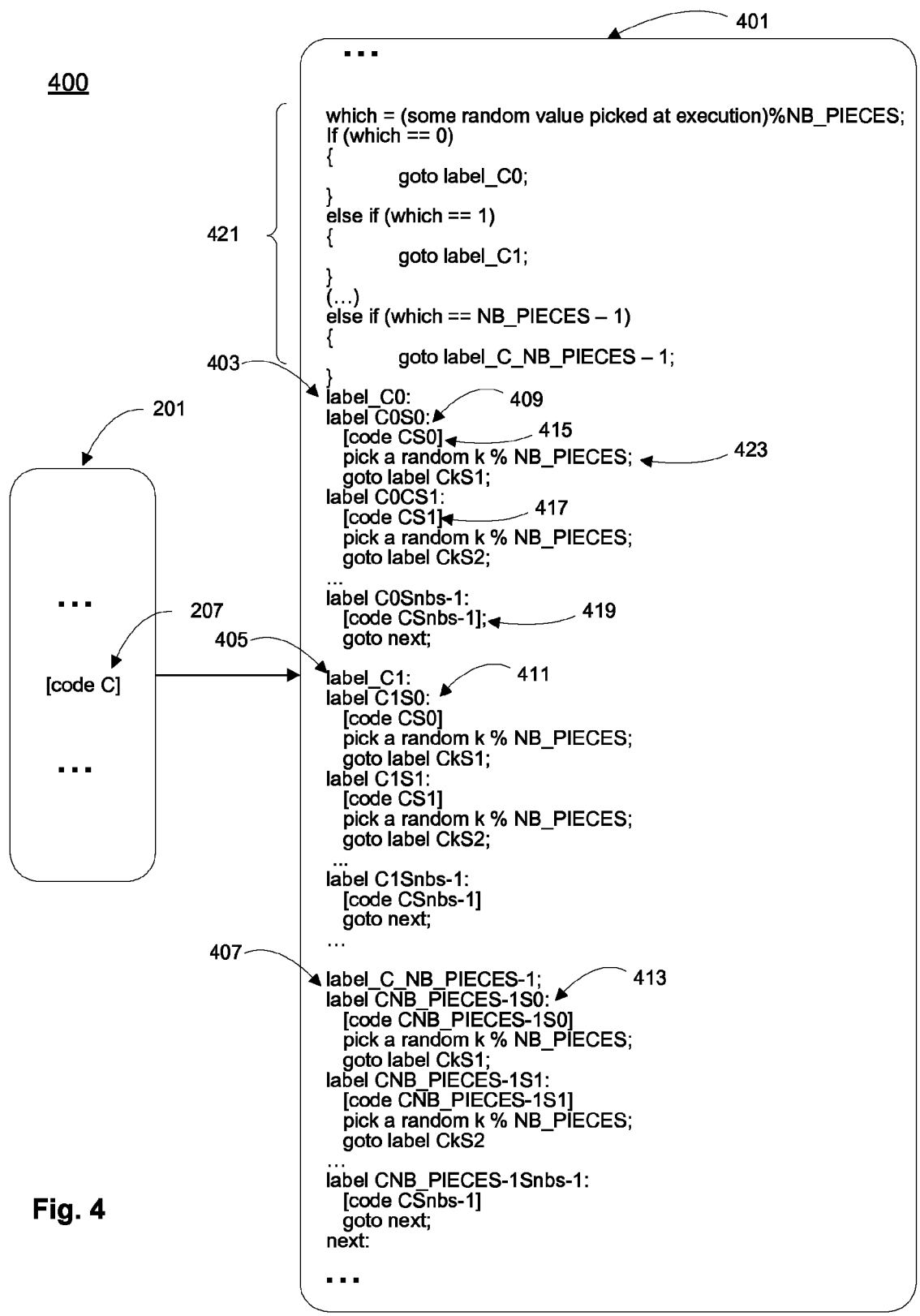
FIG. 4 is a block diagram illustrating sample pseudocodes with multiple copies of sub blocks of code recursively split from a code block according to one embodiment of the invention.

FIG. 4 is a block diagram illustrating sample pseudocodes with multiple copies of sub blocks of code recursively split from a code block according to one embodiment of the invention. For example, code 400 may be provided via recursively split and multiply operations based on some components of system 100 of FIG. 1.

In one embodiment, code block duplication can be used recursively on a code spilt arbitrarily. Code block 2 may be duplicated into NB_PIECES copies, such as code duplicates with labels 215, 217, 219 in FIG. 2. Each code duplicate can be further partitioned, separately, into NB_SPLIT partitions, such as four split partitions 305, 307, 309, 311 of FIG. 3.

For example, code 401 may be updated from code 201 via split and duplication operations on code block 207. Code 401 may include NB_PIECES copies of code block 207 as indicated via labels 403, 405, 407 etc. Each copy of the code block is equivalent to code block 207. Split operations may be applied to each copy of the code block similarly (or in the same way) to partition the copy of code block split into same number (or separate numbers) of parts, such as code blocks 415, 417, 419 etc. Partition CjSi may represent ith partition split from jth copy of the code block.

Code 401 may include random execution path selection code 421 to allow jumps from one CjSi to another CkS{i+1} (for a given i, j, k), in order to obfuscate the control flow. For example, an execution path may include one C1S1 followed by C3S2.

Note that each " . . . " may denote a part where different obfuscation techniques can be applied such that each part does not look as its equivalent one. Moreover, the multiplication (or duplication) and/or split operations can be applied recursively resulting in an updated code which is very hard to understand and has a lot of random possible execution paths. Thus, attempts to reverse engineer the generated code can be significantly hardened and attacks based on statistical correlation can be effectively blocked.

Figure 5:
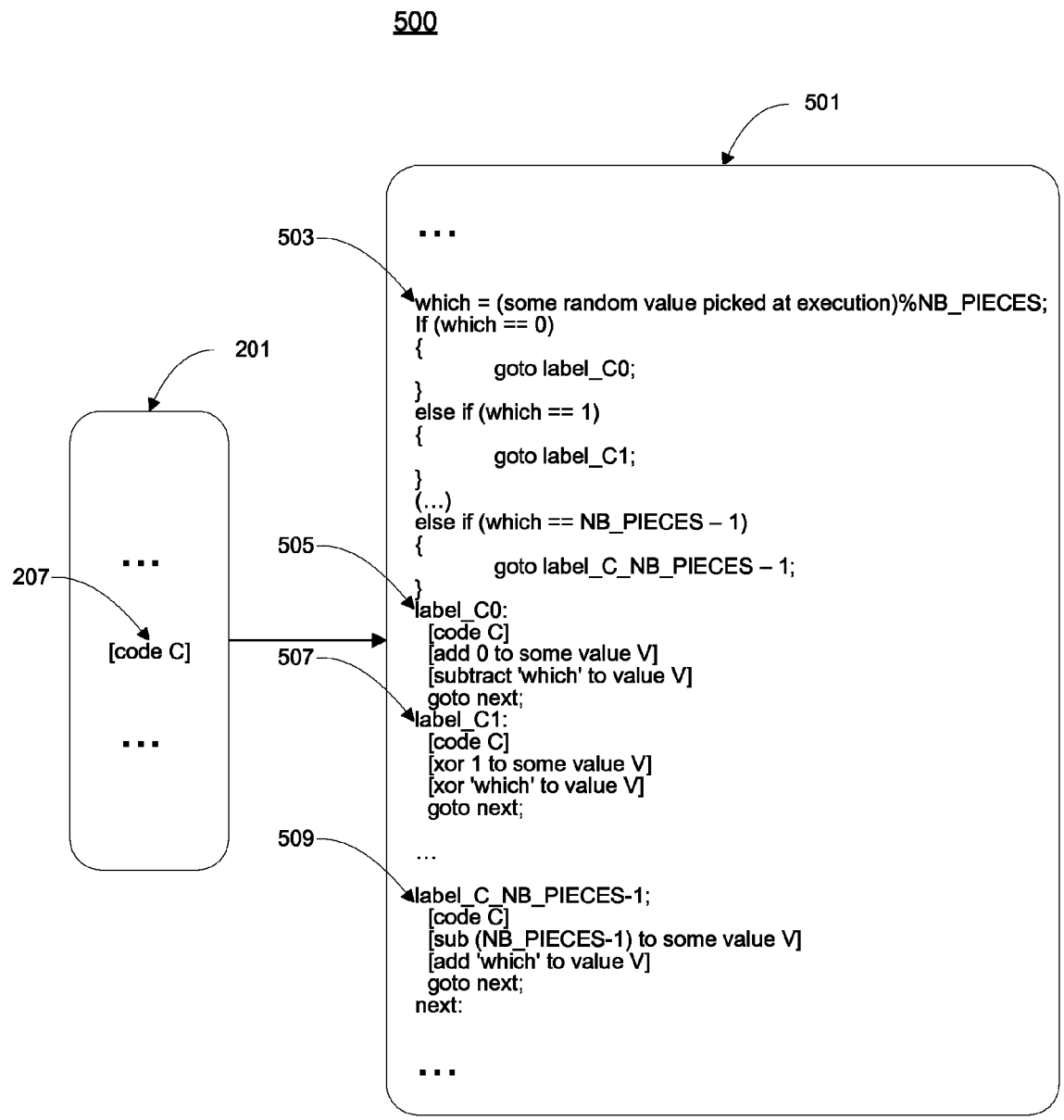
FIG. 5 is a code diagram illustrating sample pseudocodes with multiple copies of a code block obfuscated with neutralized operations according to one embodiment of the invention.

FIG. 5 is a code diagram illustrating sample pseudocodes with multiple copies of a code block obfuscated with neutralized operations according to one embodiment of the invention. For example, code 500 may be provided via recursively split and multiply operations based on some components of system 100 of FIG. 1. Exemplary code 501 may be based on code 201 updated via duplication operations with varied return signatures.

Copies of code block 207 in code 501 may be associated with separate labels, such as labels 505, 507, 509, randomly selected during runtime based on a random value of variable 503. Each code block may be inserted with additional code to compute a neutral code or a different function based on the runtime value of the variable. The code block inserted with the neural code when executed may behave the same way as the code block. The code block inserted with the neutral code can have a different running signature compared with the code block without the neutral code.

Code 501 may include different neutrals for separate labels associated with different copies of the code block. The expected value of variable 503 can be known during runtime as execution is directed to the copies of the code block via the labels. As a result, code 501 can behave as code 201. In other words, the two programs 201, 501 may be equivalent in term of results.

Code 501 may provide better protection against active attacks and reverse engineering attempts. For example, if the adversary tries to execute a portion of code associated with only label 505, the result will not be the same as executing code 501. Further, reverse engineering is harder as each copy of the code block is now different with a different neutral code. Note that the neutral code may include a variety of obfuscation operations to create a different execution trace on each equivalent code. Code obfuscation operations may include shuffling, fertilization, aggregation and/or neutralizing operations described in patent application Ser. No. 13/411,099 entitled "Method and Apparatus for Obfuscating Program Source Code", which is hereby incorporated by reference in its entirety.

Figure 6:
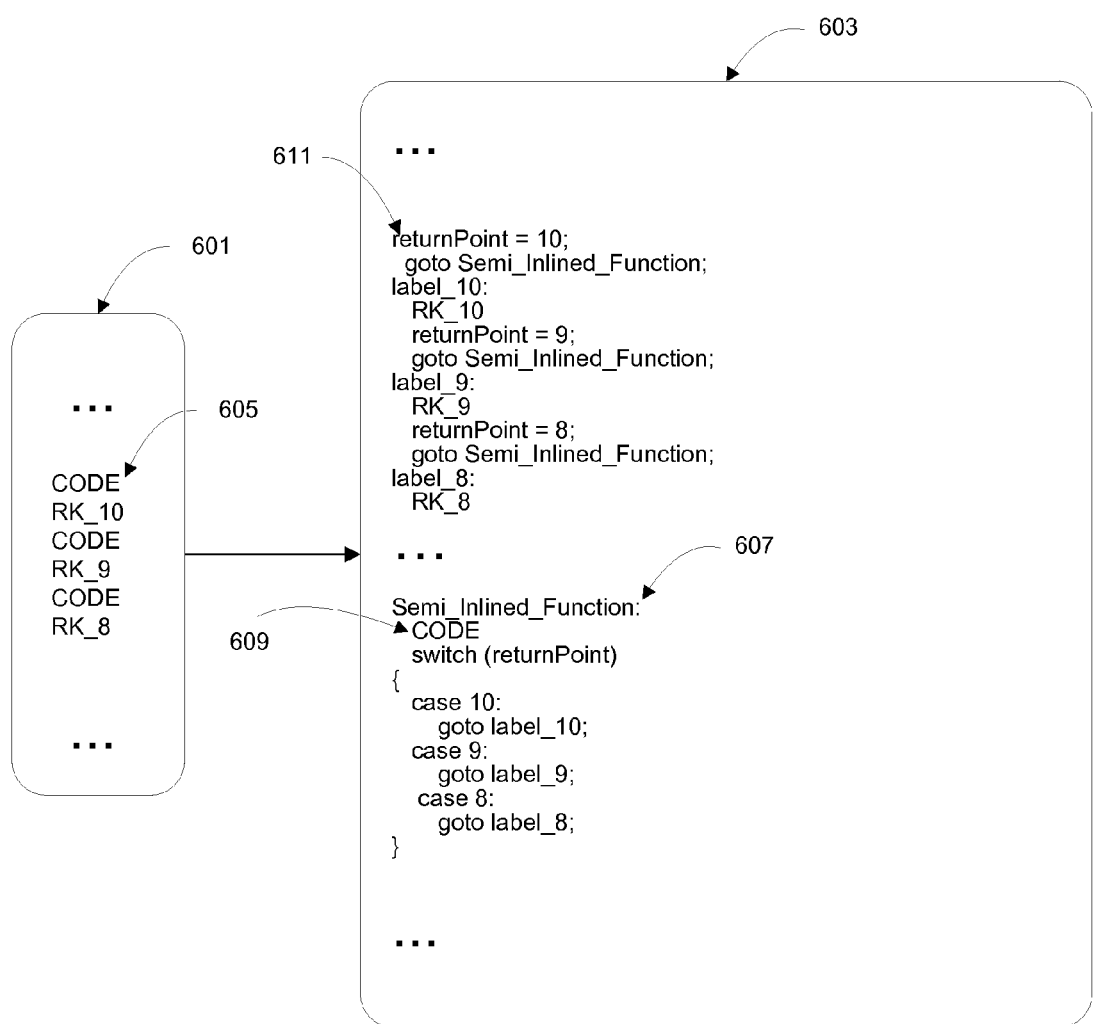
FIG. 6 is a code diagram illustrating sample pseudocodes to factorize multiple copies of a code block with a single copy of the code block according to one embodiment of the invention.

FIG. 6 is a code diagram illustrating sample pseudocodes to factorize multiple copies of a code block with a single copy of the code block according to one embodiment of the invention. For example, code 600 may be provided via recursively split and multiply operations based on some components of system 100 of FIG. 1. Code 600 may include semi-inlined functions to update a source code to store several different lines of code in the same address to protect against correlation attacks. Existing 1-to-1 or n-to-1 links in the original source code may be broken by creating collisions between different values via the semi-inlined functions.

For example, code 601 may include multiple copies of code block CODE 605. In some embodiments, code 601 may perform AES operations including ARK operations via code RK_10, RK_9, RK_8 etc. A semi-inlined function may include a function code sharing its variables with its calling function (or core function). For example, code 603 includes semi-inlined function 607 having code block CODE 609 corresponding to multiple copies of code block CODE 605 of code 601.

Main differences between a semi-inlined function and a regular function can include a return point variable, such as return Point 611, to dynamically determine which code to return to from the semi-inlined function. In one embodiment, implementation of a semi-inlined function can be based on assembly (or machine) instructions such as CALL to transfer execution to a function code, RET to return execution from a function code. For example, an execution for invoking a semi-inlined function may include directly stacking a program counter (PC), using a CALL, and at the end, a RET to come back to the return point.

Advantages of semi-inlined functions may include enhanced security. Semi-inlined functions may be embedded with the core (or calling function) and not easily replaceable to protect against, for example, WhiteBox based attacks. For example, different versions (or copies) of code block CODE 605 in code 601 (e.g. insecure version) are replaced by a single code block CODE 609. Thus, the same address is used for several different piece of codes in code 609 to create collisions against, for example, correlation or links. Additional de-synchronization of a semi-inlined function can prevent an attacker from using time to recognize different versions (or copies, parts) of a common code block, such as code block CODE 609. De-synchronization of a semi-inlined function code may be based on additional code for calling a random number at the beginning, at the end, and advantageously in the middle of the semi-inlined function.

Furthermore, invoking semi-inlined functions may improve code execution speed (e.g. compared with original source code, such as code 601) as the variable sharing does not need to access a call stack. Semi-inlined functions may provide another advantage with reduced code size with a single copy of a code block, such as code block CODE 609 vs. multiple copies of the code block in the original source code, such as code block CODE 605 in code 601.

FIG. 7 is a flow diagram illustrating one embodiment of a process for obfuscating source code via multiple copies of a code block in the source code. Exemplary process 700 may be performed by a processing logic that may include hardware, software or a combination of both. For example, process 700 may be performed by system 100 of FIG. 1. At block 701, the processing logic of process 700 can receive a first source code, such as source code 103 of FIG. 1, for example, to compile the first source code for execution. The first source code may include a code block to perform data processing operations.

At block 703, the processing logic of process 700 can update the first source code with multiple copies of the code block. The updated source code may include multiple copies of the code block instead of a single copy of the code block. The data processing operations of the code block may be performed, during runtime, via a random one of the copies of the code block.

At block 705, the processing logic of process 700 may generate a second source code, such as code 113 of FIG. 1, based on the updated first source code. The processing logic of process 700 may insert selection code into the second source code to randomly direct, during runtime executing the second source code, the execution to a random one of the copies of the code block. For example, the processing logic of process 700 can update the first source code to replace the original copy of the code block with the selection code.

In one embodiment, the selection code can comprise a random number generator to generate a random number. During runtime, according to a random value, one of the copies of the code block may be selected based on the random number generated. The second source code may include identifiers separately identifying the copies of the code blocks. The selection code may reference the copies of the code blocks via these identifiers, for example, via code labels provided for the copies of the code blocks.

In one embodiment, the second source code when executed by a processor can produce an identical result as the first source code. In other words, both the first source code and the second source code may be executed to perform the same task although runtime values observed or written in corresponding runtime memories used for the execution may differ.

The processing logic of process 700 may obfuscate the identifiers identifying different copies of the code block in the second source code. The obfuscated identifiers can allow instructions corresponding to the selection code to direct the execution to instructions corresponding to the copies of the block code indirectly without explicitly referencing memory addresses of the instructions corresponding to the copies of the block code.

In some embodiments, the selection code may include a number of values separately representing different copies of the code block. A variable in the selection code may be randomly assigned with one of the values during runtime executing the second source code. The selection code may be executed to direct the execution to a random one of the copies of the code block according to the randomly assigned value for the variable.

In one embodiment, the second source code may include a particular variable for further obfuscating execution paths. For example, the processing logic of process 700 may append neutral code to a particular copy of the code block corresponding to a particular one of the number of values in the selection code for directing an execution path to the particular copy of the code block. The neutral code may perform mutually neutralized operations on the particular variable to obfuscate the particular copy of the code block. Two mutually neutralized operations may be performed on a value without changing the value, such as operations illustrated via code 501 of FIG. 5.

For example, the neutral code may perform a first operation to update the particular variable with the one particular value and a second operation on the updated particular variable via a runtime value of the variable in the selection code for directing execution paths. The first and second operations may be, for example, a pair of mutually opposite arithmetic operations, such as +/−, XOR/XOR or other applicable operations. The second operation may undo the effects on the particular variable updated by the first operation.

In one embodiment, the second source code may include multiple copies of the code block which comprises multiple separate sub blocks of code. A first one of the sub-blocks of code and a second one of the sub-blocks of code may be located consecutively (e.g. in sequence according to lines of source code or instructions) in the code block. At least one of the copies of the code block may be split into copies of the sub-blocks of code in the second source code.

For example, at least one copy of the code block may include a first copy of the first sub-block of code and a second copy of the second sub-block of code. The first copy of the first sub-block of code and the second copy of the second sub-block of code may be located at non-consecutive code locations in the second source code. The processing logic of process 700 may insert jump code next to the first copy of the first sub-block of code. The jump code may be executed to direct the execution of the second source code to instructions corresponding to the second copy of the second sub-block of code to obfuscate control flow of the code block for the execution.

According to one embodiment, the first source code may be associated with a control flow for code execution. The first source code may include a next code block following the code block according to the control flow to perform one or more next operations. For example, a consecutive portion of the first source code may include the code block and the next code block. The processing logic of process 700 may split the consecutive portion of the first source code into the code block and the next code block.

The processing logic of process 700 may update the first source code for the second source code with two or more copies of the next code block to perform the next operations via a random one of the copies of the next code block. The copies of the code block and the copies of the next code block may be non-consecutively located in the second source code to obfuscate the control flow.

In some embodiments, the second source code may include equal number of copies of the code block and copies of the next code block. Alternatively, the number of copies of the code block and the number of copies of the next code block may not be equal.

The processing logic of process 700 may insert a separate selection code next to (e.g. according to code locations such as line numbers) each copy of the code block in the second source code. Each separate selection code, such as code 423 of FIG. 4, may be executed to direct the execution of the second source code randomly to one of the copies of the next code block to produce the same or identical results as the first source code. In one embodiment, at least two of the separate selection codes are copies of each other.

Alternatively, one of the separate selection code may be configured or specified to randomly direct the execution of the second source code to only a portion of the copies of next code block. For example, the separate selection code can randomly select one of half of total copies of next code block (e.g. based on a sequence of index numbers associated with labels associated with the copies of the next code block) without possibility to select the other half or the rest of the copies of the next code block. In some embodiments, which group of the next code blocks a selection code can randomly direct the execution to may be dynamically and unpredictably determined during runtime to introduce further randomness.

In one embodiment, the processing logic of process 700 can recursively update the first source code via code block multiplication or duplication and sub code block splitting for each copy of duplicated code block. Thus, the second source code may include multiple copies of a code block from the first source code. Each copy of the code block may be split into multiple sub blocks of code. Each sub block of code may be further duplicated and split into smaller copies of codes recursively within the second source code.

FIG. 8 is a flow diagram illustrating one embodiment of a process for obfuscating source code having multiple copies of a code block via a single copy of the code. Exemplary process 800 may be performed by a processing logic that may include hardware, software or a combination of both. For example, process 800 may be performed by system 100 of FIG. 1. At block 801, the processing logic of process 800 may receive first source code having multiple copies of a code block located at separate code locations in the first source code for execution and/or compilation. Each copy of the code block may perform one or more operations.

At block 803, the processing logic of process 800 may update the first source code by replacing the multiple copies of the code block with a single copy of the code block for the operations. The processing logic of process 800 may generate a second source code based on the updated first source code at block 805. The second code when executed by a processor may produce an identical result as the first source code.

In one embodiment, the copies of the code block in the first source code may include a first copy and a second copy of the code block. The first source code may have a first execution path including, in sequence, the first copy of the code block, a first code block of the first source code and the second copy of the code block. An execution path of a source code may represent a sequence of code in the source code to be executed when executing the source code. The execution path may represent a portion or a path of a control flow for the source code.

The second source code may include a semi-inlined code block and an updated first code block, for example, non-consecutively located in separate code locations in the second source code. The semi-inline code block may include the single copy of the code block which replaces the multiple copies of the code block of the first source code. The updated first code block may include the first code block of the first source code.

In one embodiment, the second source code has a second execution path corresponding to the first execution path of the first source code. For example, the first execution path of the first source code and the second execution path of the second source code may be executed to provide identical results.

According to certain embodiments, the updated first code block may include a first jump code to direct the second execution path to the semi-inlined code block. Optionally or additionally, the updated first code block may include a first assignment code assigning a value to a particular variable of the second source code. The semi-inlined code block may include selection code referencing the particular variable to direct the second execution path. For example, the selection code can be executed following the execution of the copy of the code block in the semi-inlined code block for the second execution path.

In one embodiment, the first execution path of the first source code can include a second code block of the first source code following the second copy of the code block in sequence of execution order. The second source code may include an updated second code block including the second code block. The selection code may include a second jump code to direct the second execution path to the updated second code block. For example, the selection code may be executed to select the second jump code based on the value of the particular variable assigned by the assignment code.

In one embodiment, the second execution path may include the updated first code block, the semi-inlined code block and the updated second code block following execution sequence. The first assignment code of the updated first code block may assign a value to the particular variable. The selection code of the semi-inlined code block may direct the execution for the second execution path to the updated second code block according to the value of the particular variable.

FIG. 9 is a flow diagram illustrating one embodiment of a process for obfuscating source code having an execution path via multiple equivalent execution paths. Exemplary process 900 may be performed by a processing logic that may include hardware, software or a combination of both. For example, process 900 may be performed by system 100 of FIG. 1. At block 901, the processing logic of process 900 may receive first source code, such as source code 103 of FIG. 1. The first source can may have a particular execution path including a code block.

At block 903, the processing logic of process 900 may update the first source code with two ore more execution paths. Each execution path may be equivalent to the particular execution path, e.g. providing identical results when executed. The updated first source code can include selection code and two or more copies of the code block. Each execution path may include a separate one of the copies of the code block. The selection code may randomly select one of the execution paths during runtime.

At block 905, the processing logic of process 900 can generate a second source code, such as obfuscated source code 113 of FIG. 1, based on the updated first source code. The second code when executed by a processor may produce an identical result as the first source code.

FIG. 10 is a flow diagram illustrating one embodiment of a process for obfuscating source code having an execution path via multiple equivalent sub execution paths in the execution path. Exemplary process 1000 may be performed by a processing logic that may include hardware, software or a combination of both. For example, process 1000 may be performed by system 100 of FIG. 1. At block 1001, the processing logic of process 1000 may receive first source code having a particular execution path including a first code block followed by a second code block. The first source code may include the first code block and the second code block.

At block 1003, the processing logic of process 1000 can update the first source code with a first number of copies of the first code block, a second number of copies of the second code block, and selection code. The updated first source code can have a third number of execution paths. Each of the execution paths may be equivalent to the particular execution path of the first source code.

In one embodiment, each of the third number of execution paths of the updated first source code may include one of the copies of the first code block and one of the copies of the second code block. The selection code may randomly select one of the execution paths during runtime. At block 1005, the processing logic of process 1000 may generate a second source code based on the updated first source code. The second code when executed by a processor produces an identical result as the first source code.

Figure 11:
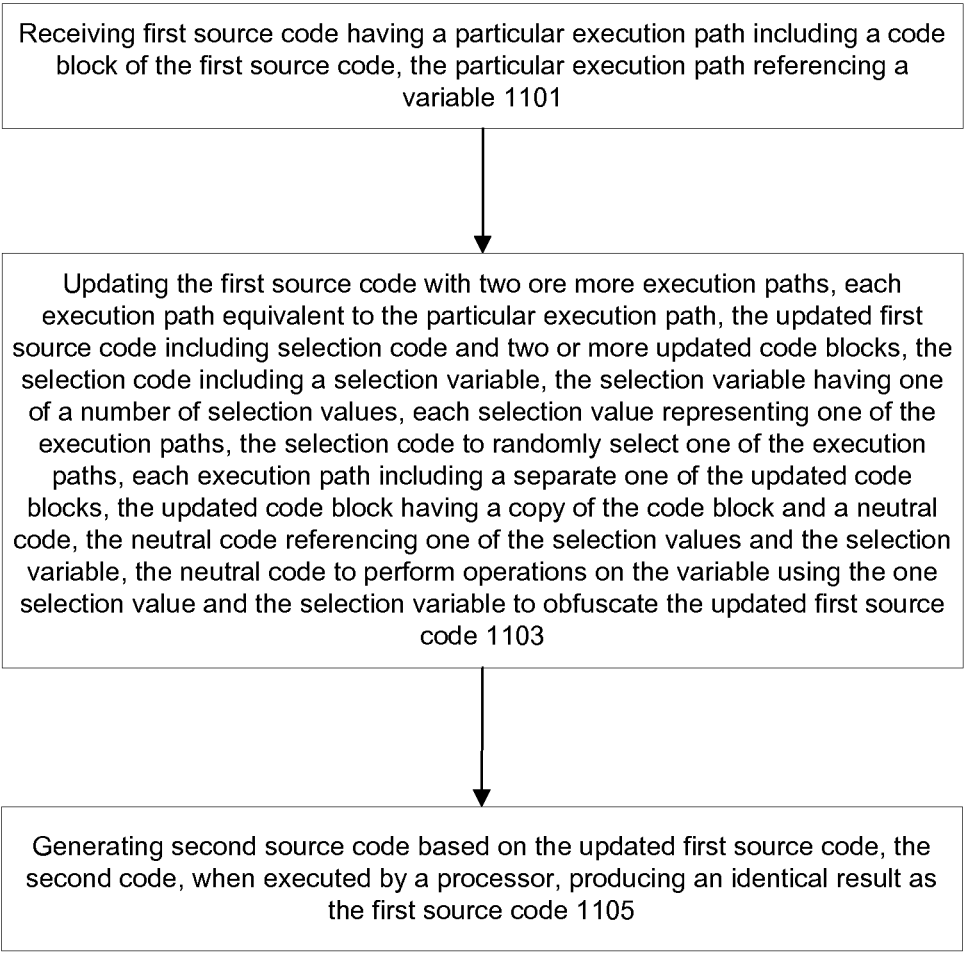
FIG. 11 is a flow diagram illustrating one embodiment of a process for obfuscating source code having an execution path via multiple equivalent execution paths having neutralized operations.

FIG. 11 is a flow diagram illustrating one embodiment of a process for obfuscating source code having an execution path via multiple equivalent execution paths having neutralized operations. Exemplary process 1100 may be performed by a processing logic that may include hardware, software or a combination of both. For example, process 1100 may be performed by system 100 of FIG. 1. At block 1101, the processing logic of process 1100 may receive first source code having a particular execution path including a code block of the first source code. The particular execution path may reference a variable in the first source code.

At block 1103, the processing logic of process 1100 may update the first source code with two ore more execution paths. Each execution path may be equivalent to the particular execution path of the first source code. The updated first source code may include selection code and two or more updated code blocks. The selection code can include a selection variable. In one embodiment, the selection variable may be specified or coded to be assigned with one of a number of selection values during runtime. Each selection value may represent one of the execution paths. In other words, when the selection variable is assigned with a particular selection value, one of the execution paths corresponding to the particular selection value is executed.

In one embodiment, the selection code may randomly select one of the execution paths. Each execution path may include a separate one of updated code blocks having a copy of the code block and a neutral code. The neutral code may reference one of the selection values and the selection variable to perform operations to obfuscate the updated first source code. The operations may be performed on a variable based on one of the selection values and the selection variable. The operations may include mutually canceling arithmetic operations or other applicable data processing operations which may change the value of the variable and then undo the change made on the value of the variable. At block 1105, the processing logic of process 1100 can generate a second source code based on the updated first source code. The second code when executed by a processor produces an identical result as the first source code.

FIG. 12 is a flow diagram illustrating one embodiment of a process for execution of randomly selected equivalent instructions compiled from obfuscated source code. Exemplary process 1200 may be performed by a processing logic that may include hardware, software or a combination of both. For example, process 1200 may be performed by system 100 of FIG. 1. At block 1201, the processing logic of process 1200 may execute executable code accessing a key value. The executable code may include two or more copies of a code block to perform operations using the key value. Each copy of the code block addressed via a separate instruction address in the executable code.

At block 1203, the processing logic of process 12 may determine randomly one of the separate instruction addresses in an executable code for a particular copy of the code block addressed via the random one instruction address determined. At block 1205, the processing logic of process 12 can perform the operations via the particular copy of the code block in the executable code. The result of the operations performed may be independent of which copy of the code block addressed by the random one instruction address to prevent correlation between the key value and the particular copy of the code block.

Figure 13:
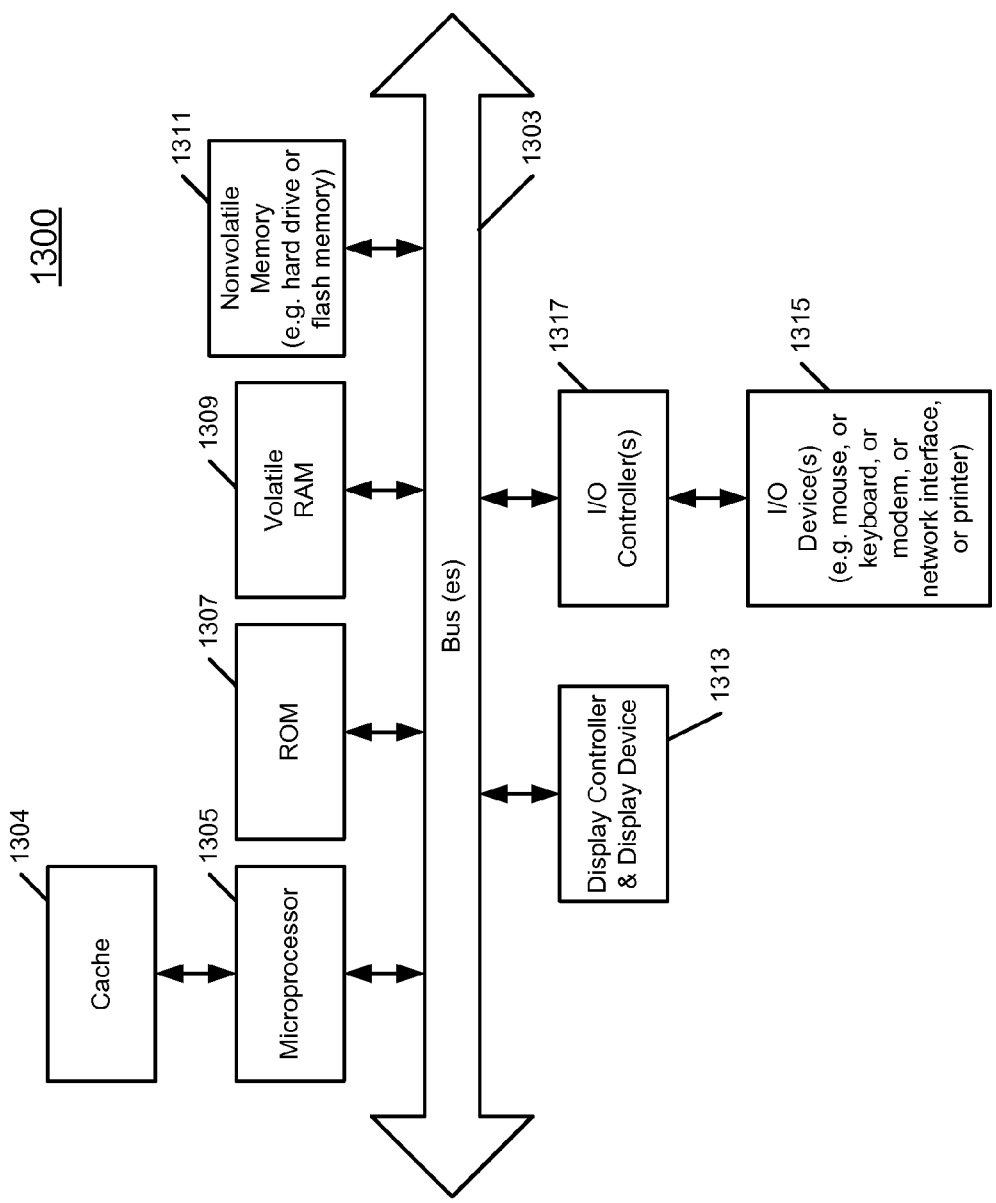
FIG. 13 illustrates one example of a data processing system such as a computer system, which may be used in conjunction with the embodiments described herein.

FIG. 13 shows one example of a data processing system, such as a computer system, which may be used with one embodiment the present invention. For example, system 1 of FIG. 1 may be implemented as a part of the system shown in FIG. 13. Note that while FIG. 13 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 13, the computer system 1300, which is a form of a data processing system, includes a bus 1303 which is coupled to a microprocessor(s) 1305 and a ROM (Read Only Memory) 1307 and volatile RAM 1309 and a non-volatile memory 1311. The microprocessor 1305 may retrieve the instructions from the memories 1307, 1309, 1311 and execute the instructions to perform operations described above. The bus 1303 interconnects these various components together and also interconnects these components 1305, 1307, 1309, and 1311 to a display controller and display device 1313 and to peripheral devices such as input/output (I/O) devices which may be mice, keyboards, modems, network interfaces, printers and other devices which are well known in the art. Typically, the input/output devices 1315 are coupled to the system through input/output controllers 1317. The volatile RAM (Random Access Memory) 1309 is typically implemented as dynamic RAM (DRAM) which requires power continually in order to refresh or maintain the data in the memory.

The mass storage 1311 is typically a magnetic hard drive or a magnetic optical drive or an optical drive or a DVD RAM or a flash memory or other types of memory systems which maintain data (e.g. large amounts of data) even after power is removed from the system. Typically, the mass storage 1311 will also be a random access memory although this is not required. While FIG. 13 shows that the mass storage 1311 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 1303 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer implemented method comprising:
receiving first source code having a code block, the first source code including a code block to perform one or more operations for execution based on the first source code;
updating the first source code with two or more copies of the code block resulting in an updated first source code including the two or more copies of the code block, the one or more operations to be performed via a random one of the two or more copies of the code block; and
generating second source code based on the updated first source code, wherein a first executable code compiled from the first source code includes instructions compiled from the code block, wherein a second executable code compiled from the second source code includes instructions compiled from the two or more copies of the code block, and wherein the first executable code and the second executable code when executed by a processor produces an identical result.

2. A machine-readable non-transitory storage medium having instructions stored therein, which when executed by a computer, cause the computer to perform a method comprising:
receiving first source code having a code block, the first source code including a code block to perform one or more operations for execution based on the first source code;
updating the first source code with two or more copies of the code block resulting in an updated first source code including the two or more copies of the code block, the one or more operations to be performed via a random one of the two or more copies of the code block; and
generating second source code based on the updated first source code, wherein a first executable code compiled from the first source code includes instructions compiled from the code block, wherein a second executable code compiled from the second source code includes instructions compiled from the two or more copies of the code block, and wherein the first executable code and the second executable code when executed by a processor produce an identical result.

3. The medium of claim 2, wherein the second source code includes selection code to perform random selection for a random access of one of the copies of the code block, wherein the execution is directed to the random one of the copies of the code block according to the random selection.

4. The medium of claim 3, wherein the selection code comprises a random number generator to generate a random number and wherein the random one of the copies of the code block is selected based on the random number.

5. The medium of claim 3, wherein the updating the first source code comprises:
replacing the code block with the selection code.

6. The medium of claim 3, wherein the second source code includes identifiers separately identifying the copies of the code blocks and wherein the selection code refers to the copies of the code blocks via the identifiers.

7. The medium of claim 3, wherein the selection code includes a number of values separately representing the copies of the code block, wherein the selection code includes a variable to be randomly assigned with one of the number of values, and wherein the selection code directs the execution to the random one copy of the code block according to the randomly assigned one value for the variable.

8. The medium of claim 7, wherein the second source code includes a particular variable, the method further comprising:
appending neutral code to a particular one of the copies of the code block, the particular copy of the code block corresponding to a particular one of the number of values, the neutral code to perform a first operation to the particular variable with the one particular value, the neutral code to perform a second operation to the particular variable with the variable of the selection code, wherein the second operation neutralizes the first operation on the particular variable during the execution.

9. The medium of claim 8, wherein the first operation and the second operation are based on opposite arithmetic operations.

10. The medium of claim 6, the method further comprising:
obfuscating the identifiers, wherein the obfuscated identifiers allow instructions corresponding to the selection code to direct the execution to instructions corresponding to the copies of the block code indirectly without referencing memory addresses of the instructions corresponding to the copies of the block code.

11. The medium of claim 2, wherein the second source code includes the copies of the code block, wherein the code block includes two or more sub-blocks of code, wherein a first one of the sub-blocks of code is followed by a second one of the sub-blocks of code consecutively in the code block, and wherein the update of the first source code comprises:
splitting the code block into copies of the sub-blocks of code for at least one of the copies of the code block, wherein the at least one copy of the code block includes a first copy of the first sub-block of code and a second copy of the second sub-block of code, the first copy of the first sub-block of code and the second copy of the second sub-block of code located at non-consecutive code locations in the second source code.

12. The medium of claim 11, further comprising,
inserting jump code next to the first copy of the first sub-block of code, the jump code to direct the execution to instructions corresponding to the second copy of the second sub-block of code, the jump code to obfuscate control flow of the code block for the execution.

13. The medium of claim 2, wherein the first source code is associated with a control flow for the execution, wherein the first source code includes a next code block following the code block according to the control flow, the next code block to perform one or more next operations for the execution, the method further comprises:
updating the first source code with two or more copies of the next code block, the next operations to be performed via a random one of the copies of the next code block.

14. The medium of claim 13, wherein number of the copies of the code block and number of copies of the next code block are not equal in the second source code.

15. The medium of claim 13, further comprising,
inserting separate selection code next to each copy of the code block, each separate selection code to direct the execution randomly to one of the copies of the next code block.

16. The medium of claim 14, wherein at least two of the separate selection codes are copies of each other.

17. The medium of claim 14, wherein a first one of the separate selection code is capable of randomly directing the execution to only a portion of the copies of next code block without possibility to direct the execution to rest of the copies of next code block.

18. The medium of claim 15, wherein a second one of the separate selection code is capable of randomly directing the execution to only the rest of the copies of next code block without possibility to direct the execution to the portion of the copies of next code block.

19. The medium of claim 13, wherein a consecutive portion of the first source code includes the code block and the next code block, the method further comprising:
   splitting the consecutive portion of the first source code into the code block and the next code block, wherein the copies of the code block and the copies of the next code block are non-consecutively located in the second source code to obfuscate the control flow.

20. The medium of claim 19, wherein the update and the splitting are recursively performed for the second source code.

21. A machine-readable non-transitory storage medium having instructions stored therein, which when executed by a computer, cause the computer to perform a method comprising:
   receiving first source code having multiple copies of a code block located at separate code locations in the first source code, each copy of the code block to perform one or more operations;
   updating the first source code with one copy of the code block resulting in an updated first source code including the one copy of the code block replacing the multiple copies of the code block for the one or more operations; and
   generating second source code based on the updated first source code, the second source code including the one copy of the code block, the second source code without the multiple copies of the code block, wherein a first executable code compiled from the first code includes instructions compiled from the multiple copies of the code block, wherein a second executable code compiled from the second source code includes instructions compiled from the one copy of the code block without including the multiple copies of the code block, and wherein when executed by a processor the first executable code and the second executable code produce an identical result.

22. The medium of claim 21, wherein the copies of the code block include a first copy of the code block and a second copy of the code block, wherein the first source code includes a first code block, wherein the first source code has an first execution path having the first copy of the code block, the first code block and the second copy of the code block in sequence, wherein the second source code includes a semi-inlined code block and an updated first code block, the semi-inlined code block including the one copy of the code block, the updated first code block including the first code block, wherein the second source code has a second execution path corresponding to the first execution path of the first source code and wherein the updated first code block includes first jump code to direct the second execution path to the semi-inlined code block.

23. The medium of claim 22, wherein the updated first code block includes a first assignment code assigning a first value to a particular variable, wherein the semi-inlined code block includes selection code referencing the particular variable to direct the second execution path.

24. The medium of claim 23, wherein the selection code follows the one copy of the code block in the semi-inlined code block for the second execution path.

25. The medium of claim 23, wherein the first source code includes a second code block, wherein the second code block follows the second copy of the code block in the sequence of the first execution path, wherein the second source code includes an updated second code block, the updated second code block including the second code block, wherein the selection code includes second jump code to direct the second execution path to the updated second code block, and wherein the selection code selects the second jump code if the particular variable has the first value.

26. A machine-readable non-transitory storage medium having instructions stored therein, which when executed by a computer, cause the computer to perform a method comprising:
   receiving first source code having a particular execution path including a code block of the first source code;
   updating the first source code by adding selection code and at least one copy of the code block, the updating resulting in an updated first source code including two or more execution paths, each execution path equivalent to the particular execution path, each execution path including a separate copy of the code block, the selection code to randomly select one of the execution paths; and
   generating second source code based on the updated first source code, wherein a first executable code compiled from the first source code has instructions compiled from the particular execution path, wherein a second executable code compiled from the second source code has instructions compiled from the two or more execution paths, and wherein the first executable code and the second executable code when executed by a processor produce an identical result.

27. A machine-readable non-transitory storage medium having instructions stored therein, which when executed by a computer, cause the computer to perform a method comprising:
   receiving first source code having a particular execution path including a first code block followed by a second code block, code block and the second code block;
   updating the first source code by adding a first number copies of the first code block, a second number copies of the second code block, and selection code, the updating resulting an updated first source code, wherein the updated first source code has a third number of execution paths, each execution path equivalent to the particular execution path, each execution path including one of the copies of the first code block and one of the copies of the second code block, the selection code to randomly select one of the execution paths; and
   generating second source code based on the updated first source code, wherein a first executable code compiled from the first source code includes instructions compiled from the particular execution path, wherein a second executable code compiled from the second code includes instructions compiled from the third number of the execution paths, and wherein the first executable code and the second executable code when executed by a processor produce an identical result.

28. A machine-readable non-transitory storage medium having instructions stored therein, which when executed by a computer, cause the computer to perform a method comprising:
   receiving first source code having a particular execution path including a code block of the first source code, the particular execution path referencing a variable;
   updating the first source code by adding selection code and two or more updated code blocks, the updating resulting in an updated first source code having two or more execution paths, each execution path equivalent to the particular execution path, the selection code including a selection variable, the selection variable having one of a number of selection values, each selection value representing one of the execution paths, the selection code to randomly select one of the execution paths, each execution path including a separate one of the updated code blocks, each updated code block having a copy of the code block and a neutral code, the neutral code referencing one of the selection values and the selection variable, the neutral code to perform operations on the variable using the one selection value and the selection variable to obfuscate the updated first source code; and generating second source code based on the updated first source code, wherein a first executable code compiled from the first source code includes instructions compiled from the particular executable path, wherein a second executable code compiled from the second source code includes instructions compiled from the two or more execution paths, and wherein the first executable code and the second executable code when executed by a processor produce an identical result.

29. A machine-readable non-transitory storage medium having instructions stored therein, which when executed by a computer, cause the computer to perform a method comprising:

executing executable code accessing a key value, the executable code including instructions compiled from selection code and two or more copies of a code block, each copy of the code block to perform common operations using the key value, instructions compiled from each copy of the code block addressed via a separate instruction address in the executable code, the execution comprises:

determining, via the selection code, a random one of the separate instruction addresses for instructions compiled from a particular one of the copies of the code block; and performing the common operations via instructions compiled from the particular one copy of the code block, wherein result of the common operations performed is independent of which copy of the code blocks addressed by the random one separate instruction address to prevent correlation between the key value and the particular copy of the code block, wherein a source code is provided with the code block to perform the common operations using the key value, wherein the source code is updated with the selection code and the copies of the code block, wherein the executable code is compiled from the updated source code, wherein a separate executable compiled from the source code, and wherein the executable code and the separate executable code, when executed by a processor, produce an identical result.

30. A computer system comprising:

a memory storing executable instructions; and a processor coupled to the memory to execute the executable instructions from the memory, the processor being configured to receive first source code having a code block, the first source code including a code block to perform one or more operations for execution based on the first source code, update the first source code with two or more copies of the code block resulting in an updated first source code including the two or more copies of the code block, the one or more operations to be performed via a random one of the two or more copies of the code block, and generate second source code based on the updated first source code, wherein a first executable code compiled from the first source code includes instructions compiled from the code block, wherein a second executable code compiled from the second code includes instructions compiled from the two or more copies of the code block, and wherein the first executable code and the second executable code when executed by a processor produce an identical result.

* * * * *